US009256730B2

(12) United States Patent
Wicherski

(10) Patent No.: US 9,256,730 B2
(45) Date of Patent: Feb. 9, 2016

(54) THREAT DETECTION FOR RETURN ORIENTED PROGRAMMING

(75) Inventor: Georg Wicherski, Aachen (DE)

(73) Assignee: CrowdStrike, Inc., Irvine, CA (US)

(*) Notice: Subject to any disclaimer, the term of this patent is extended or adjusted under 35 U.S.C. 154(b) by 0 days.

(21) Appl. No.: 13/607,155

(22) Filed: Sep. 7, 2012

(65) Prior Publication Data

US 2014/0075556 A1     Mar. 13, 2014

(51) Int. Cl.
    *G06F 21/52*        (2013.01)
    *G06F 21/55*        (2013.01)
    *G06F 11/30*        (2006.01)

(52) U.S. Cl.
    CPC .............. *G06F 21/52* (2013.01); *G06F 21/554* (2013.01); *G06F 11/3003* (2013.01); *G06F 2201/81* (2013.01); *G06F 2201/865* (2013.01); *G06F 2201/88* (2013.01)

(58) Field of Classification Search
    CPC ... G06F 21/52; G06F 21/554; G06F 2201/88; G06F 2201/865; G06F 11/3003; G06F 2201/81
    USPC ........................................................ 726/1–36
    See application file for complete search history.

(56) References Cited

U.S. PATENT DOCUMENTS

| | | | | |
|---|---|---|---|---|
| 5,604,877 A * | 2/1997 | Hoyt | ...................... | G06F 9/3806 712/238 |
| 5,949,973 A * | 9/1999 | Yarom | ............................. | 726/23 |
| 6,941,473 B2 * | 9/2005 | Etoh et al. | .......................... | 726/5 |
| 6,971,019 B1 * | 11/2005 | Nachenberg | ................... | 713/188 |
| 7,272,748 B1 * | 9/2007 | Conover | ............. | G06F 11/1407 712/233 |
| 7,581,089 B1 * | 8/2009 | White | ................... | G06F 9/4426 712/242 |
| 7,594,111 B2 * | 9/2009 | Kiriansky et al. | ............. | 713/166 |
| 7,603,704 B2 * | 10/2009 | Bruening et al. | ............... | 726/22 |
| 7,650,640 B1 * | 1/2010 | Levy | ................................ | 726/24 |
| 7,853,803 B2 * | 12/2010 | Milliken | ........................ | 713/190 |
| 7,886,148 B2 * | 2/2011 | Kiriansky et al. | ............. | 713/166 |
| 8,117,660 B2 * | 2/2012 | Pan et al. | ......................... | 726/25 |
| 8,359,450 B2 * | 1/2013 | Crosby et al. | ................. | 711/170 |
| 8,397,082 B2 * | 3/2013 | Milliken | ........................ | 713/190 |
| 2003/0088862 A1 * | 5/2003 | Ramasamy | ......... | G06F 9/30054 717/158 |
| 2004/0133777 A1 * | 7/2004 | Kiriansky et al. | ............. | 713/166 |
| 2004/0143727 A1 * | 7/2004 | McDonald | .................... | 712/228 |
| 2004/0168078 A1 * | 8/2004 | Brodley | ................. | G06F 21/52 713/190 |

(Continued)

OTHER PUBLICATIONS

Bare, "CPU Performance Counter-Based Problem Diagnosis for Software Systems", Sep. 2009, retrieved from the internet at http://reports-archive.adm.cs.cmu.edu/anon/2009/CMU-CS-09-158.pdf, 68 pgs.

(Continued)

*Primary Examiner* — Joseph P Hirl
*Assistant Examiner* — J. Brant Murphy
(74) *Attorney, Agent, or Firm* — Lee & Hayes, PLLC

(57) ABSTRACT

Techniques for detecting security exploits associated with return-oriented programming are described herein. For example, a computing device may determine that a retrieved count is indicative of malicious activity, such as return oriented programming. The computing device may retrieve the count from a processor performance counter of prediction mismatches, the prediction mismatches resulting from comparisons of a call stack of the computing device and of a shadow call stack maintained by a processor of the computing device. In response to determining that the count indicates malicious activity, the computing device may perform at least one security response action.

18 Claims, 4 Drawing Sheets

(56) References Cited

U.S. PATENT DOCUMENTS

| | | | |
|---|---|---|---|
| 2007/0174912 A1* | 7/2007 | Kraemer et al. | 726/23 |
| 2007/0180524 A1* | 8/2007 | Choi et al. | 726/23 |
| 2008/0022405 A1* | 1/2008 | Wang et al. | 726/23 |
| 2009/0089564 A1 | 4/2009 | Brickell et al. | |
| 2009/0320129 A1* | 12/2009 | Pan et al. | 726/22 |
| 2010/0011209 A1* | 1/2010 | Kiriansky et al. | 713/166 |
| 2010/0180159 A1* | 7/2010 | Bittles et al. | 714/38 |
| 2011/0072418 A1* | 3/2011 | Kalamegham et al. | 717/128 |
| 2011/0252132 A1* | 10/2011 | Wetzer et al. | 709/224 |
| 2013/0024937 A1* | 1/2013 | Glew | G06F 21/577 726/23 |
| 2013/0031364 A1* | 1/2013 | Glew et al. | 713/162 |
| 2013/0117843 A1* | 5/2013 | Komaromy et al. | 726/23 |
| 2013/0185792 A1* | 7/2013 | Balakrishnan et al. | 726/22 |
| 2014/0075556 A1* | 3/2014 | Wicherski | 726/23 |

OTHER PUBLICATIONS

Davi, et al., "ROPdefender: A Detection Tool to Defend Against Return-Oriented Programming Attacks", Proceedings of the 6th ACM Symposium on Information, Computer and Communications Security, Hong Kong, China, Mar. 22-24, 2011, pp. 40-51.

The PCT Search Report and Written Opinion mailed Dec. 27, 2013 for PCT application No. PCT/US13/58496, 13 pages.

Yuan, et al., "Security Breaches as PMU Deviation: Detecting and Identifying Security Attacks Using Performances Counters", Proceedings of the Second Asia-Pacific Workshop on Systems, Shanghai, China, Jul. 11-12, 2011, Article No. 6, 5 pgs.

Singapore Office Action mailed Nov. 13, 2015 for Singapore patent application No. 112015010835, a counterpart foreign application of U.S. Appl. No. 13/607,155, 12 pages.

* cited by examiner

100A ADVERSARY EXPLOITS VULNERABILITY

100B PERFORMANCE MONITOR DETECTS PREDICTION MISMATCH BETWEEN EXPLOITED CALL STACK AND SHADOW STACK AND INCREMENTS PERFORMANCE COUNTER

100C DETERMINE PERFORMANCE COUNT INDICATES MALICIOUS ACTIVITY AND PERFORM SECURITY RESPONSE ACTION

THREAT DETECTION FOR RETURN ORIENTED PROGRAMMING

BACKGROUND

With Internet use forming an ever greater part of day to day life, security exploits that steal or destroy system resources, data, and private information are an increasing problem. Governments and businesses devote significant resources to preventing intrusions and thefts related to these security exploits. Security exploits come in many forms, such as computer viruses, worms, trojan horses, spyware, keystroke loggers, adware, rootkits, and shellcodes. These exploits are delivered in or through a number of mechanisms, such as spearfish emails, clickable links, documents, executables, or archives. Some of the threats posed by security exploits are of such significance that they are described as cyber terrorism or industrial espionage.

A variant of the shellcode security exploits known as Return Oriented Programming (ROP) has proven very difficult to detect. Return oriented programming makes use of a security vulnerability of a computing device to spoof or control the call stack of that computing device. By spoofing or controlling the call stack, the security exploit is able to utilize select instructions of legitimate processes to effectively create and execute a shellcode. The use of legitimate instructions circumvents memory safeguards that have been put in place to stop shellcode security exploits. The only techniques that have been developed for detecting and responding to return oriented programming, however, impose a substantial performance cost.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure describes, in part, techniques for detecting security exploits associated with return-oriented programming. The techniques include determining that a retrieved count is indicative of malicious activity, such as return oriented programming. The count may be retrieved from a processor performance counter of prediction mismatches, the prediction mismatches resulting from comparisons of a call stack of a computing device and of a shadow call stack maintained by a processor of the computing device. The techniques further include performing at least one security response action in response to determining that the count indicates malicious activity.

Figure 1:
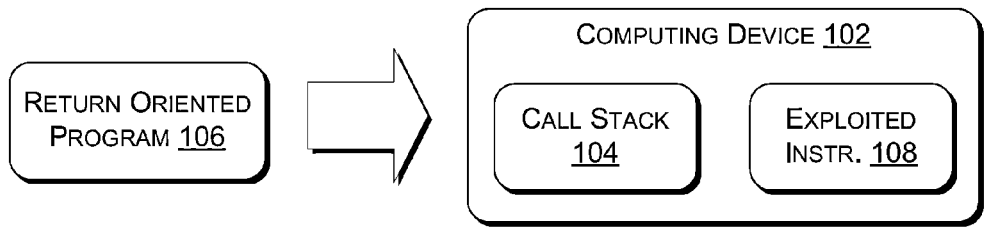
FIG. 1 illustrates an overview of techniques for detecting security exploits associated with return oriented programming, the exploits being detected based on a processor performance counter for call stack prediction mismatches.
Figure 1:
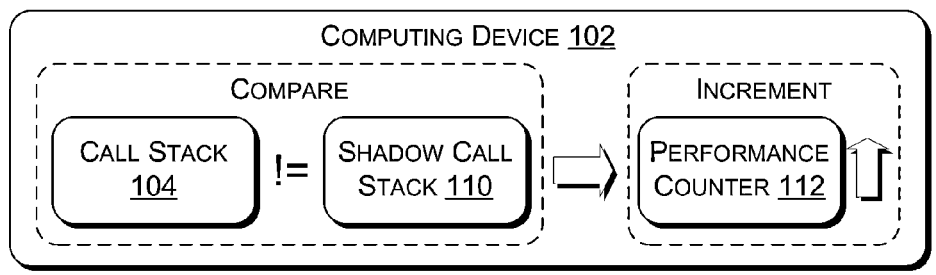
Figure 1:
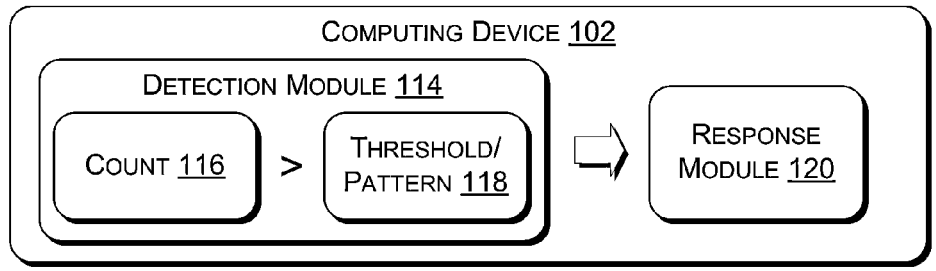

FIG. 1 illustrates an overview of such techniques. As illustrated in FIG. 1, at 100a, a computing device 102 may have a vulnerability, such as a memory corruption vulnerability, exploited by an adversary. Such a vulnerability may allow an adversary using a return oriented program 106 to control or spoof the call stack 104. By controlling or spoofing the call stack 104, the adversary is able to exploit legitimate instructions 108 (hereinafter "exploited instructions 108") of one or more processes of the computing device 102 to effectively create and execute a malicious program on the computing device 102. Like shellcode, such a malicious program may be relatively small, even just a few instructions. The return oriented program 106 supplied as part of this security exploit may execute entirely on the affected computing device 102 or may be remotely operated by an adversary system through, for example, a command shell.

At 100b, a performance monitoring unit associated with a processor of the computing device 102 may predict the value of the call stack 104 using a shadow call stack 110 or other prediction mechanism. For example, the computing device 102 may compare the call stack 104 to a shadow call stack 110 and, if the comparison results in a mismatch, may increment a performance counter 112 of the processor. The computing device 102 maintains a shadow call stack 110 in cache memory of its processor and utilizes the shadow call stack in association with a branch predictor of the computing device 102. The branch predictor attempts to guess which execution path an if-then structure or an indirect branch of a process will take before that path is known. One prediction mechanism used by the branch predictor is the shadow call stack 110, also referred to as a return stack buffer. The performance monitoring unit monitors prediction mismatches from comparisons of the shadow call stack 110 to the call stack 104 stored in system memory of the computing device 102 and, when a prediction mismatch is noted, increments the performance counter 112 specific to prediction mismatches for call stacks. These prediction mismatches may be indicative of malicious activity, such as activity of the return oriented program 106, because the return oriented program 106 may only be able to control or spoof the call stack 104, not the shadow call stack 110. The result of this disparity is often prediction mismatches.

At 100c, a detection module 114 determines that a count 116 retrieved from the performance counter 112 is indicative of malicious activity. The detection module 114 may do this by comparing the count 116 to a threshold or pattern 118. Such a threshold or pattern 118 may be determined based on monitoring counts 116 of the performance counter 112 over time. The threshold or pattern 118 may also be specific to a process or class of processes, thus allowing processes typically registering prediction mismatches to have different thresholds or pattern 118 and thereby avoiding false positives. For process- or process-class-specific thresholds or pattern 118, the detection module 114 may also retrieve an indication of the process or processes executing at the time that the count 116 was retrieved and then determine an appropriate threshold or pattern 118 based on the indication of the active process(es).

Also, as shown at 100c, if the detection module 114 determines that the count 116 exceeds the threshold 118 or diverges from the pattern 118, the detection module 114 may invoke or notify the response module 120, the response module 120 performing at least one security response action. For example, the security response action may be providing a graphic, audible, or haptic alert to a user of the computing device 102. Also or instead, the security response action may be notifying a remote security monitoring server of the malicious activity. Further, the security response action may be asking a user of the computing device whether one or more active processes (i.e., the one or more processes being executed by the processor associated with the count 116) should be halted and halting the one or more processes. Additionally, the security response action may be determining information associated with one or more actives processes and analyzing the determined information. The response module 120 may then monitor, or cause another component to monitor, execution activities associated with the one or more active processes.

In some embodiments, the detection module 114 and the response module 120 may be implemented on the computing device 102. In other embodiments, the detection module 114 and the response module 120 may be implemented by a remote security service. When implementing the detection module 114, the remote security service communicates with logic of the computing device 102 that is configured to retrieve the count 116 from the performance counter 112, enabling the detection module 114 of the remote security service to retrieve the count 116 from that logic. In yet other embodiments, the detection module 114 and the response module 120 may be implemented in part by the computing device 102 and in part by a remote security service.

Example Device

Figure 2:
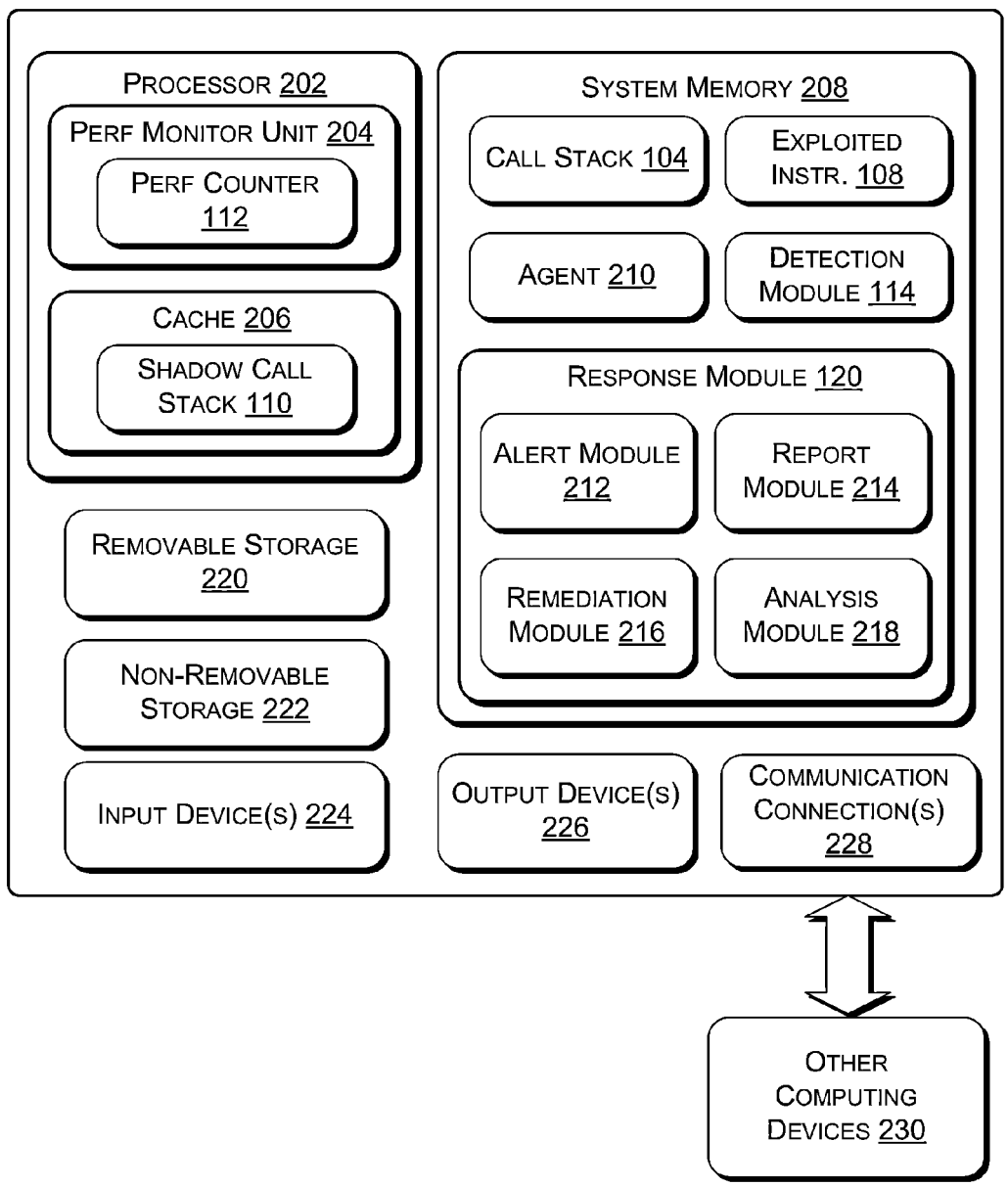
FIG. 2 illustrates a component level view of a computing device affected by a return oriented programming security exploit.

FIG. 2 illustrates a component level view of a computing device affected by a return oriented programming security exploit. As illustrated, the computing device 102 includes a processor 202, the processor 202 including a performance monitoring unit 204 and cache memory 206. The performance monitoring unit 204 may in turn include one or more performance counters, such as performance counter 112. The cache memory 206 may store the shadow call stack 110.

The computing device 102 may also include system memory 208. The system memory 208 may store the call stack 104, exploited instructions 108, a security agent 210, the detection module 114, and the response module 120. The response module 120 may in turn include an alert module 212, a report module 214, a remediation module 216, and an analysis module 218.

In addition, the computing device may include a removable storage 220, non-removable storage 222, input device(s) 224, output device(s) 226 and communication connections 228 for communicating with other computing devices 230.

In some embodiments, the computing device 102 may be or include a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. In one implementation, the computing device 102 represents a plurality of computing devices working in communication, such as a cloud computing network of nodes. In some implementations, the computing device 102 includes one or more virtual machines.

In various embodiments, the processor 202 is a central processing unit (CPU), such as a processor associated with the 8086 architecture (e.g., the Intel i7® processor) or the 68000 architecture. The computing device may also include one or more other processors, such as a graphic processing unit (GPU), not shown in FIG. 2. In addition to the performance monitoring unit 204 and the cache 206, the processor 202 may include other cache memories, registers, buffers (e.g., translation lookaside buffers), tables, arithmetic logic units (ALUs), interface buses, etc.

The performance monitoring unit 204 (PMU 204) collects information regarding the performance of the processor 202 and regarding applications or processes being executed by the processor 202. The PMU 204 may include a number of registers and performance counters, the numbers and types of registers and performance counters varying based on the type of the processor 202. Further, the PMU 204 gathers performance information, performs any processing on that information needed to update performance counters, and updates the performance counters. For example, the PMU 204 may compare the call stack 104 to the shadow call stack 110 to determine if there is a prediction mismatch. In some embodiments, this performance information may be obtained, at least in part, from a branch prediction unit of the processor 202. If there is a prediction mismatch, the PMU 204 updates the count for the performance counter 112. While FIG. 2 shows the PMU 204 including the performance counter 112, the PMU 204 may also include other performance counters measuring other aspects of system or process performance.

The cache 206 may be any sort of cache memory of the processor 202, such as L1 cache or L2 cache. As mentioned above, the cache 206 may store a shadow call stack 110, which is also sometimes referred to as a "return stack buffer." In some embodiments, the shadow call stack 110 may be stored in cache 206 that is even closer to the CPU of processor 202 than the L1 cache. The shadow call stack 110 is used for branch predictions that attempt to predict the state of the call stack 104. In operation, the shadow call stack 110 will often mirror the call stack 104.

In various embodiments, system memory 208 is volatile (such as RAM), non-volatile (such as ROM, flash memory, etc.) or some combination of the two. As shown, the system memory 208 includes the call stack 104. The call stack 104 is a data structure that stores information about the active subroutines of processes of the computing device 102. For example, the call stack 104 stores the memory address that the subroutine should return control to following operation. As mentioned above, this call stack 104 may be controlled or spoofed by a return oriented program 106 using a vulnerability of the computing device 102 or of one of its applications. By spoofing or controlling the call stack 104, the return oriented program 106 causes control to be returned to the wrong memory addresses. These wrong memory addresses are associated with legitimate, exploited instructions 108 of one or more processes that are then executed in such a manner as to produce malicious activity.

In various embodiments, the system memory 208 may also include a security agent 210. The security agent 210 may be a kernel-level security agent that observes and acts upon execution activities of the computing device 102. The security agent 210 may be configurable by a remote security service, receiving, and applying while live, reconfigurations of filters, components, models, etc. of the security agent 210. Based on the observed execution activities, the security agents 210 may generate security information which the security agent 210 may act upon and/or provide to the remote security service. While the detection module 114 and response module 120 are shown as being separate from the security agent 210, one or both may, in other embodiments, be components of the security agent 210. An example security agent 210 is described in greater detail in U.S. patent application Ser. No. 13/492,672, entitled "Kernel-Level Security Agent" and filed on Jun. 8, 2012.

As described above, the detection module 114 may determine a threshold or pattern 118 associated with malicious activity, may retrieve the count 116 from the performance counter 112, and may determine whether the count 116 indicates malicious activity by comparing the count 116 to the threshold or pattern 118. In some embodiments, the detection module 114 may monitor the performance counter 112 over a time period, periodically retrieving its count 116 and synthesizing the retrieved counts 116. These synthesized counts 116 may provide a description of typical values for the performance counter 112, and the detection module 114 may set the threshold 118 or pattern based at least in part on the counts and/or synthesized counts 116. In further embodiments, the detection module 114 may determine a threshold or pattern 118 for each process or each class or type of process by concurrently monitoring the performance counter 112 and active process(es).

The detection module 114 may further retrieve the count 116 from the performance counter 112, either periodically or in response to the occurrence of one or more triggering events. The processor 202 may include an interface enabling application processes or platform-level processes to obtain the count 116, and the detection module 114 may utilize that interface. Upon retrieving the count 116, the detection module 114 compares the count 116 to the threshold or pattern 118. If the count 116 exceeds the threshold 118 or diverges from the pattern 118, the detection module 114 determines that the count 116 indicates malicious activity and, in response, invokes the response module 120. If the threshold is specific to a process or class or type of processes, the detection module 114 may also obtain an indication of the active process or processes and select an appropriate threshold or pattern 118. If multiple processes associated with different thresholds or patterns 118 are active, the detection module 114 may, for example, select the highest value threshold or pattern 118.

In various embodiments, the response module 120 may determine an appropriate response to the malicious activity detected by the detection module 114. The response module 120 may include a number of modules associated with varying responses, such as an alert module 212, a report module 214, a remediation module 216, and an analysis module 218. In some embodiments, there may be no response module 120, with the modules 212-218 taking the place of the response module 120 and being invoked directed by the detection module 114. The response module 120 may invoke any one or more of the modules 212-218 in order to respond appropriately to the malicious activity. The module(s) 212-218 invoked may depend on settings or a configuration of the response module 120.

The alert module 212 may provide the user of the computing device 102 with a visual, audible, or haptic alert of the malicious activity. In some embodiments, the alert is simply informative. In other embodiments, the alert may present the user with one or more options for responding to the malicious activity, such as a report option which may result in invocation of the report module 214 or a remediation option with may result in invocation of the remediation module 216 or of the security agent 210.

In some embodiments, the report module 214 may prepare and send a report of the malicious activity to a remote security service. The report module 214 may be invoked by the response module 120 or by the alert module 212 responsive to a user selection of a reporting option. The report generated by the report module 214 may include the count 116, the threshold or pattern 118, an indication of one or more active processes, and/or information about the state of the call stack 104 and/or the shadow call stack 110.

In various embodiments, the remediation module 216 may halt one or more active processes. The remediation module 216 may be invoked by the response module 120 or by the alert module 212 responsive to a user selection of a remediation option. In some embodiments, prior to halting the one or more active processes, the remediation module 216 may ask the user whether the user wishes to halt the one or more active processes. If the user elects to halt the one or more active processes, then the remediation module 216 may halt those process(es).

In further embodiments, an analysis module 218 may determine information associated with the one or more active processes and may analyze that determined information. For example, if the security agent 210 or other computing device component maintains a model of execution activities of the one or more active processes, the analysis module 218 may retrieve the information associated with the active process(es) and compare it to the model. Such analysis may detect differences in execution flow that may confirm the determination that malicious activity is occurring. The analysis module 218 may then either monitor the execution activities of the one or more active processes or invoke the security agent 210 or other computing device component to perform the monitoring. Such monitoring may enable the computing device 102 to obtain more information about the malicious activity after it has been detected.

Computing device 102 also includes additional data storage devices (removable and/or non-removable) such as, for example, magnetic disks, optical disks, or tape. Such additional storage is illustrated in FIG. 2 by removable storage 220 and non-removable storage 222. Tangible computer-readable media may include volatile and nonvolatile, removable and non-removable media implemented in any method or technology for storage of information, such as computer readable instructions, data structures, program modules, or other data. System memory 208, removable storage 218 and non-removable storage 220 are all examples of tangible computer-readable media. Tangible computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information and which can be accessed by the computing device 102. Any such tangible computer-readable media may be part of the computing device 102.

Computing device 102 also has input device(s) 224, such as a keyboard, a mouse, a touch-sensitive display, voice input device, etc., and output device(s) 226 such as a display, speakers, a printer, etc. These devices are well known in the art and need not be discussed at length here.

Computing device 102 also contains communication connections 228 that allow the computing device 102 to communicate with other computing devices 230, such as a remote security service or an adversary system.

Example Network

Figure 3:
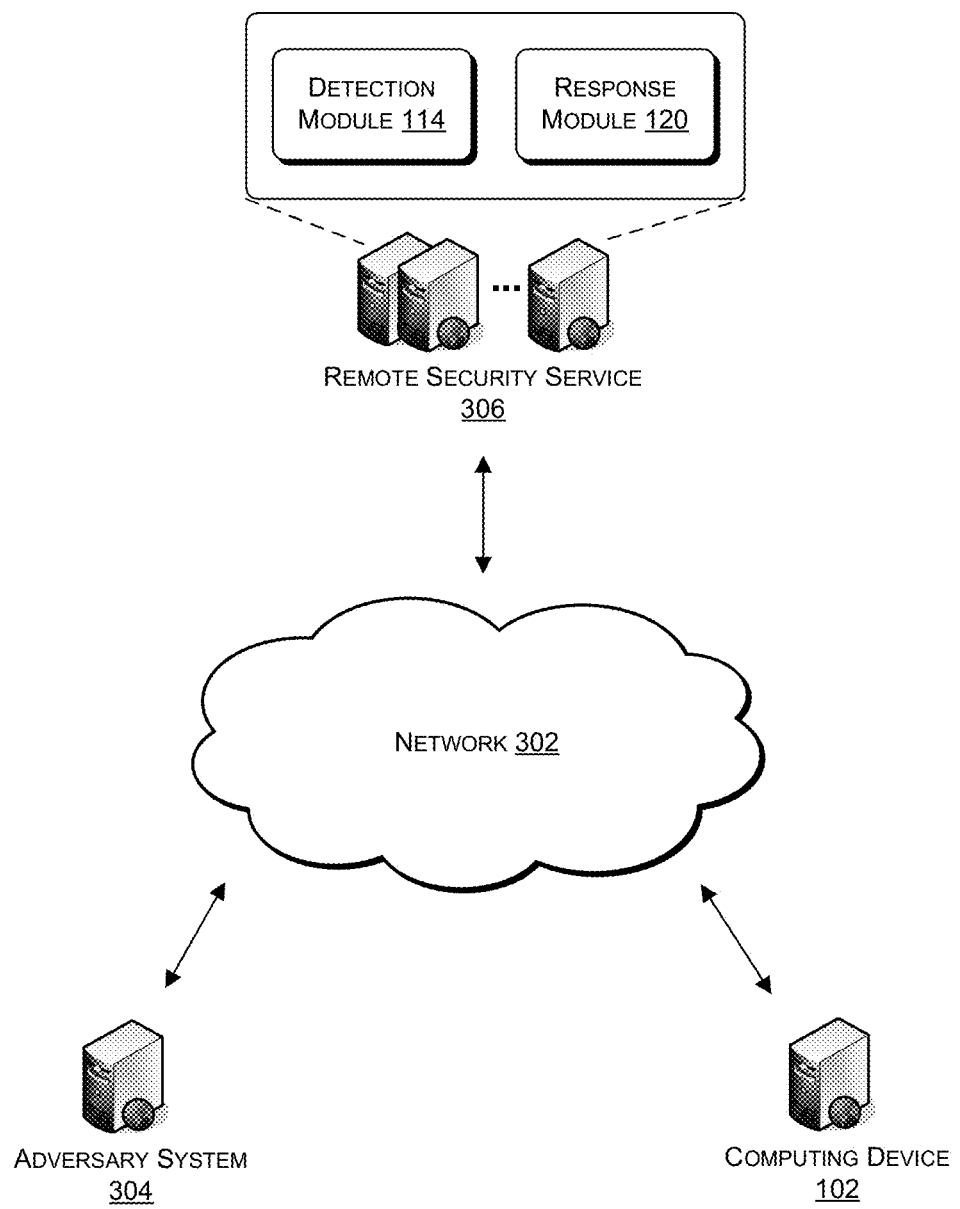
FIG. 3 illustrates an example network connecting an adversary attacking a vulnerability, a computing device affected by that attack, and a remote security service configured to detect and/or respond to the attack.

FIG. 3 illustrates an example network 302 connecting an adversary 304 exploiting a vulnerability with a return oriented program 106, a computing device 102 affected by that security exploit, and a remote security service 306 configured to detect, monitor, and/or respond to the security exploit.

In some embodiments, the network 302 may include any one or more networks, such as wired networks, wireless networks, and combinations of wired and wireless networks. Further, the network 302 may include any one or combination of multiple different types of public or private networks (e.g., cable networks, the Internet, wireless networks, etc.). In some instances, computing devices communicate over the network 302 using a secure protocol (e.g., https) and/or any other protocol or set of protocols, such as the transmission control protocol/Internet protocol (TCP/IP).

In various embodiments, the adversary system 304 and the remote security service 306 may each be or include a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. In one implementation, the computing devices of the remote security service 306 represent a plurality of computing devices working in communication, such as a cloud computing network of nodes. When implemented on multiple computing devices, the remote security service 306 may distribute the detection module 114 and response module 120 among the multiple computing devices. In some implementations, one or more of the adversary system 304 and remote security service 306 represent one or more virtual machines implemented on one or more computing devices.

In some embodiments, the adversary system 304 may be any computing device configured to utilize a return oriented program 106 to exploit a vulnerability, such as a memory corruption vulnerability that enables an adversary system 304 to control or spoof a call stack 104. As mentioned above, the return oriented program 106 may execute entirely on the computing device 102 or may be remotely controlled through the adversary system 304. Such remote control may involve a command shell or other interface provided by the adversary system 304 to its adversary user.

In various embodiments, the remote security service 306 may provide monitoring, configuration and healing services to the computing device 102. Such services may include, for example, configuring or reconfiguring the security agent 210, installing the security agent 210, receiving reports and alerts from computing devices, and/or responding to an alert or report with healing, agent reconfiguration, or further monitoring. In some embodiments, as shown, the remote security service 306 may include part or all of one or both of the detection module 114 and the response module 120 and may execute that module or those modules in the manner described above. When implementing the detection module 114, the remote security service 306 communicates with logic of the computing device 102 that is configured to retrieve the count 116 from the performance counter 112, enabling the detection module 114 of the remote security service 306 to retrieve the count 116 from that logic. An example of such a remote security service 306 is described in greater detail in U.S. patent application Ser. No. 13/492,672, entitled "Kernel-Level Security Agent" and filed on Jun. 8, 2012.

In further embodiments, the remote security service 306 may provide a collaboration service that connects multiple client computing devices 102 associated with a same entity or with different entities. Such a collaboration service may relay an alert or report received from one computing device 102 to other computing devices 102, or may generate a new configuration or monitoring process to apply across a group based on an alert or report from one group member. An example remote security service 306 offering such a collaboration service is described in greater detail in U.S. patent application Ser. No. 13/538,439, entitled "Social Sharing of Security Information in a Group" and filed on Jun. 29, 2012.

Example Processes

Figure 4:
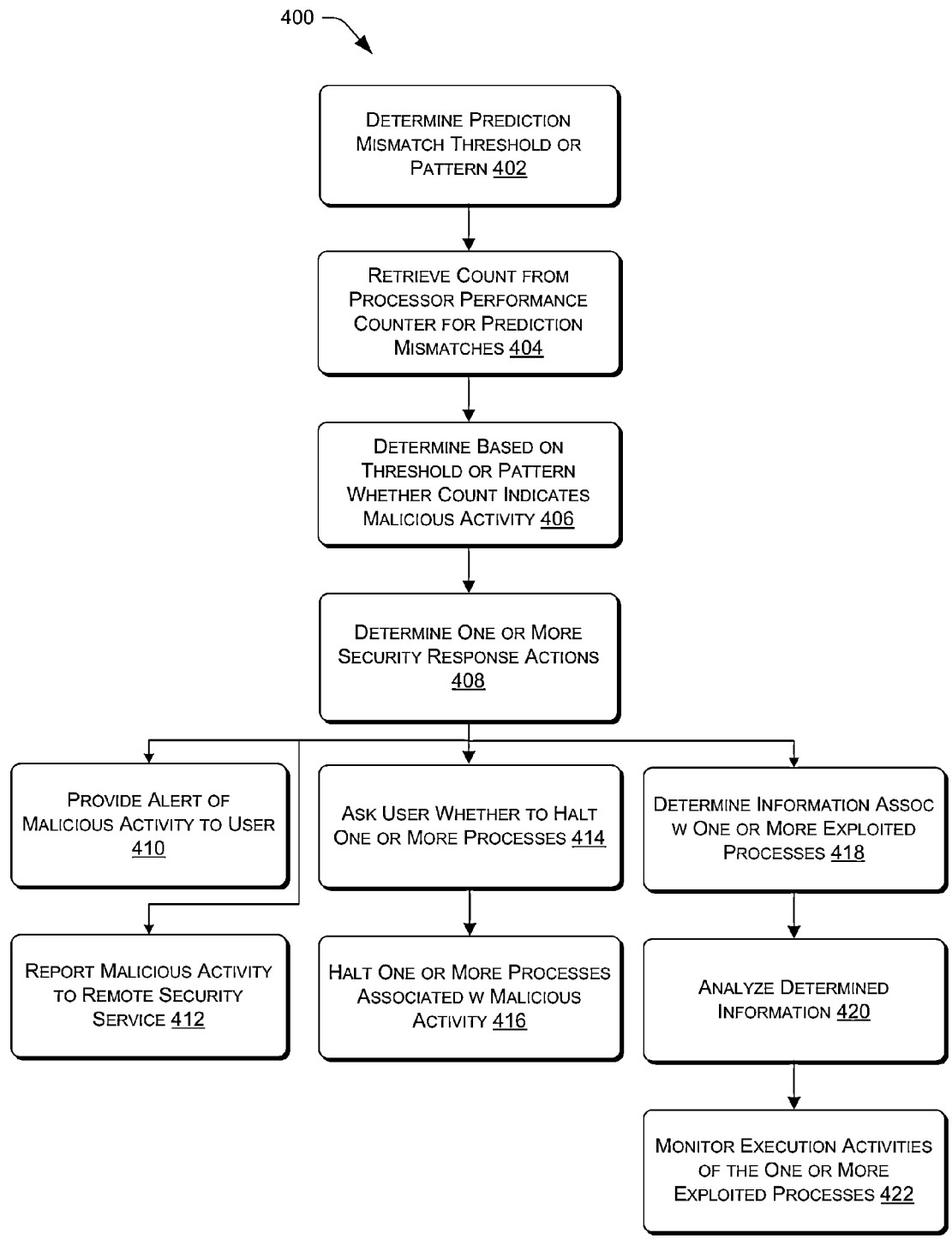
FIG. 4 illustrates an example process for retrieving a count of prediction mismatches associated with a call stack, determining that the count is indicative of malicious activity, and, in response, performing at least one security response action.

FIG. 4 illustrates an example process 400. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process for retrieving a count of prediction mismatches associated with a call stack, determining that the count is indicative of malicious activity, and, in response, performing at least one security response action. The process 400 includes, at 402, determining a prediction mismatch threshold or pattern. The prediction mismatch threshold or pattern may be indicative of a number or pattern of prediction mismatches expected to arise from comparisons of the call stack of a computing device with the shadow call stack implemented in a cache memory of a processor of the computing device. A computing device may, for example, determine the threshold or pattern by monitoring, over time, counts of a processor performance counter for prediction mismatches. Also, in some embodiments, the computing device may utilize different thresholds or pattern for different processes or classes of processes.

At 404, the computing device may retrieve the count of prediction mismatches from the processor performance counter. At 406, the computing device may then determine whether the count is indicative of malicious activity, such as return oriented programming, based at least in part on a comparison of the count to the threshold or pattern.

At 408, in response to determining that the count is indicative of malicious activity, the computing device may determine one or more security response actions. At 410, those security response actions may include providing a graphic, audible, or haptic alert to a user of the computing device. At 412, the security response actions may include notifying a remote security monitoring server of the malicious activity. At 414-416, the security response actions may include asking (at 414) a user of the computing device whether the one or more processes should be halted and halting (at 416), the one or more processes. At 418-422, the security responses may include determining (at 418) information associated with one or more processes and analyzing (at 420) the determined information. At 422, the computing device may then monitor execution activities associated with the one or more processes.

In various embodiments, the operations shown at blocks 402-422 may be performed by the computing device affected by the malicious activity, by a remote security service, or partly by each of the computing device and remote security service.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
retrieving a count of prediction mismatches from a processor performance counter, the prediction mismatches resulting from comparisons of a call stack of a computing device and of a shadow call stack maintained by a processor of the computing device, wherein the shadow call stack is used for branch predictions that attempt to predict a state of the call stack;
determining whether the count of prediction mismatches indicates malicious activity by determining whether the count of prediction mismatches exceeds a threshold or diverges from a pattern; and
in response to determining that the count of prediction mismatches indicates malicious activity, performing at least one security response action.

2. The method of claim 1, wherein the threshold or the pattern may be specific to a process or class of processes.

3. The method of claim 1, further comprising determining the threshold or the pattern based on monitoring the count of prediction mismatches over a time period.

4. The method of claim 1, wherein the at least one security response action is providing a graphic, audible, or haptic alert to a user of the computing device.

5. The method of claim 1, wherein the at least one security response action is notifying a remote security monitoring server of the malicious activity.

6. The method of claim 1, wherein the at least one security response action is halting execution of one or more processes.

7. The method of claim 6, further comprising, prior to halting, asking a user of the computer device whether the one or more processes should be halted and performing the halting conditionally on a user response.

8. The method of claim 1, wherein the at least one security response action is determining information associated with one or more processes and analyzing the determined information.

9. The method of claim 8, further comprising, after determining whether the count of prediction mismatches indicates malicious activity, monitoring execution activities associated with the one or more processes.

10. The method of claim 1, wherein the retrieving, determining, and performing are performed by the computing device, by a remote security service, or in part by both of the computing device and the remote security service.

11. One or more non-transitory computer-readable media storing computer-executable instructions configured to program first one or more computing devices to perform operations comprising:
retrieving a count of prediction mismatches from a processor performance counter, the prediction mismatches resulting from comparisons of a call stack of a second computing device and of a shadow call stack maintained by a processor of the second computing device, wherein the shadow call stack is used for branch predictions that attempt to predict a state of the call stack;
determining whether the count of prediction mismatches indicates malicious activity by determining whether the count of prediction mismatches exceeds a threshold or diverges from a pattern; and
in response to determining that the count of prediction mismatches indicates malicious activity, performing at least one security response action.

12. The one or more non-transitory computer-readable media of claim 11, wherein the second computing device is one of the first one or more computing devices.

13. The one or more non-transitory computer-readable media of claim 11, wherein the at least one security response action is providing a graphic, audible, or haptic alert to a user of the computing device.

14. The one or more non-transitory computer-readable media of claim 11, wherein the at least one security response action is notifying a remote security monitoring server of the malicious activity.

15. The one or more non-transitory computer-readable media of claim 11, wherein the at least one security response action is halting execution of one or more processes.

16. The one or more non-transitory computer-readable media of claim 11, wherein the at least one security response action is determining information associated with one or more processes and analyzing the determined information.

17. A computing device comprising:
a processor, including cache memory of the processor, a processor performance counter, and a shadow call stack stored in the cache memory;
a call stack communicatively coupled to the processor, wherein the shadow call stack is used for branch predictions that attempt to predict a state of the call stack;
a detection module configured to be operated by the processor to:
set a threshold or a pattern based at least in part on monitoring, over a period of time, a count of prediction mismatches from the processor performance counter, the prediction mismatches resulting from comparisons of the call stack and of the shadow call stack;
retrieve the count of prediction mismatches from the processor performance counter, and
determine whether the count of prediction mismatches indicates malicious activity by determining whether the count of prediction mismatches exceeds the threshold or diverges from the pattern; and
a response module configured to be operated by the processor to perform, in response to determining that the count of prediction mismatches indicates malicious activity, invoking at least one of:
an alert module of the computing device to provide a graphic, audible, or haptic alert to a user of the computing device,
a report module of the computing device to notify a remote security monitoring server of the malicious activity,
a remediation module of the computing device to halt execution of one or more processes, or
an analysis module of the computing device to determine information associated with the one or more processes and analyze the determined information.

18. The computing device of claim 17, further comprising an agent configured to monitor execution activities associated with the one or more processes after determining whether the count of prediction mismatches indicates malicious activity.

* * * * *